(12) United States Patent
Small et al.

(10) Patent No.: US 11,525,968 B2
(45) Date of Patent: Dec. 13, 2022

(54) CALIBRATION VALIDATION USING GEOMETRIC FEATURES IN GALVANOMETRIC SCANNING SYSTEMS

(71) Applicant: NLIGHT, INC., Vancouver, WA (US)

(72) Inventors: Jay Small, Vancouver, WA (US); Ken Gross, Vancouver, WA (US)

(73) Assignee: NLIGHT, INC., Camas, WA (US)

( * ) Notice: Subject to any disclaimer, the term of this patent is extended or adjusted under 35 U.S.C. 154(b) by 36 days.

(21) Appl. No.: 16/817,357

(22) Filed: Mar. 12, 2020

(65) Prior Publication Data

US 2020/0292765 A1 Sep. 17, 2020

Related U.S. Application Data

(60) Provisional application No. 62/818,624, filed on Mar. 14, 2019.

(51) Int. Cl.
*G02B 6/00* (2006.01)
*G02B 6/42* (2006.01)
*G02B 26/10* (2006.01)

(52) U.S. Cl.
CPC ......... *G02B 6/4224* (2013.01); *G02B 26/101* (2013.01); *G02B 26/105* (2013.01)

(58) Field of Classification Search
CPC ... G02B 6/4224; G02B 26/101; G02B 26/105
See application file for complete search history.

(56) References Cited

U.S. PATENT DOCUMENTS

| 5,832,415 | A | 11/1998 | Wilkening |
| 11,135,680 | B2* | 10/2021 | Wuest ................ B23K 26/342 |
| 2004/0152233 | A1 | 8/2004 | Nemets |

(Continued)

FOREIGN PATENT DOCUMENTS

WO 2009054811 A1 4/2009

OTHER PUBLICATIONS

European Patent Office, International Search Report and Written Opinion of the International Search Report in International Application No. PCT/US2019/049215, dated Nov. 26, 2019, 12 pages.

(Continued)

*Primary Examiner* — Pakee Fang
(74) *Attorney, Agent, or Firm* — Schwabe Williamson & Wyatt

(57) ABSTRACT

Some embodiments may include a method of generating assessment data in a system including a galvanometric scanning system (GSS) having a laser device to generate a laser beam and an X-Y scan head module to position the laser beam on a work piece. The method may include selecting a dimension based on a desired accuracy for validation (and/or a characteristic of an imaging system in embodiments that utilize an imaging system). The method may include commanding the GSS to draw a mark based on a polygon or ellipse of the selected dimension around a predetermined target point associated with the work piece to generate assessment data, and following operation of the GSS based on said commanding, validating a calibration of the GSS using the assessment data (or an image thereof in embodiments that utilize an imaging system). Other embodiments may be disclosed and/or claimed.

13 Claims, 7 Drawing Sheets

(56) References Cited

U.S. PATENT DOCUMENTS

| | | | |
|---|---|---|---|
| 2005/0067394 A1 | 3/2005 | Vaidyanathan et al. | |
| 2005/0205778 A1 | 9/2005 | Kitai et al. | |
| 2014/0327687 A1* | 11/2014 | Murakami | G06T 1/60 345/545 |
| 2015/0253487 A1* | 9/2015 | Nichol | G02B 6/006 362/610 |
| 2015/0276783 A1* | 10/2015 | Palella | G01C 19/5712 702/141 |
| 2015/0346483 A1* | 12/2015 | Ehrmann | B23K 26/0648 219/121.85 |
| 2018/0281067 A1 | 10/2018 | Small et al. | |
| 2018/0326485 A1* | 11/2018 | Brown | B23K 26/0604 |
| 2019/0270161 A1 | 9/2019 | Allenberg-Rabe et al. | |
| 2020/0078884 A1* | 3/2020 | Nie | B23K 26/3576 |
| 2021/0016394 A1 | 1/2021 | McCarthy et al. | |

OTHER PUBLICATIONS

European Patent Office, International Preliminary Report on Patentability International Application No. PCT/US2019/049215, dated Aug. 6, 2021, 7 pages.

* cited by examiner

GENERATING ASSESSMENT DATA ON THE WORK PIECE OR BY IMAGING THE WORK PIECE, AND VALIDATING A CALIBRATION OF THE GSS USING THE ASSESSMENT DATA

PLURAL-STAGE CALIBRATION VALIDATION
BASED ON PLURAL THRESHOLDS

CALIBRATION VALIDATION USING GEOMETRIC FEATURES IN GALVANOMETRIC SCANNING SYSTEMS

RELATED APPLICATIONS

This application is a non-provisional of and claims priority benefit to U.S. provisional application Ser. No. 62/818,624, filed on Mar. 14, 2019, which is incorporated by reference herein in its entirety.

TECHNICAL FIELD

The present disclosure relates to two-dimensional and three-dimensional galvanometric scanning systems.

BACKGROUND

Fiber lasers are widely used in industrial processes (e.g., cutting, welding, cladding, heat treatment, etc.) In some fiber lasers, the optical gain medium includes one or more active optical fibers with cores doped with rare-earth element(s). The rare-earth element(s) may be optically excited ("pumped") with light from one or more semiconductor laser sources.

Fiber laser systems may be used in laser marking machines. In one type of laser marking machine, both the laser source and the work piece are stationary and galvo (galvanometric) mirrors move the laser beam across a surface of the work piece.

In a 2D galvo system, an X-Y scan head module including two mirrors each rotatable by a galvanometric motor is located along a laser beam path between a laser device and a work piece to be marked, cut, engraved, or the like, by the laser beam. The first galvanometric motor may operate to rotate its mirror to reposition the laser beam along the work piece with respect to a first axis (the X direction). The second galvanometric motor may operate to rotate its mirror to reposition the laser beam along the work piece with respect to a second orthogonal axis (the Y direction).

A 3D galvo system is similar, except that a dynamic focus module may be used in addition to the X-Y scan head module (say, along the light path between the X-Y scan head module and the laser device). In the dynamic focus module, one or more lenses move relative to the laser device to move a point of focus of the laser beam along a third axis (the Z direction) that is orthogonal to the first and second axes, which enables three dimensional laser cutting of the work piece.

In both 2D and 3D GSSs, precision movement of the mirrors is needed to ensure that the laser marks the work piece as intended. A validation may be performed at any time to check the "aim" of the laser system (whether the laser system marks a selected location on the work piece in response to a command to mark that selected location). In a known validation test, a test point on the work piece is chosen, and then the GSS is commanded to draw lines intersecting at the chosen point, such as a X shaped marking feature or a + shaped marking feature. If the chosen point is not marked appropriately, e.g., the intersection of the X shaped or + shaped marking feature is discernably non-aligned with the chosen point, the system fails the validation test. A calibration process may be repeated on the system failing calibration validation.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

Figure 1:
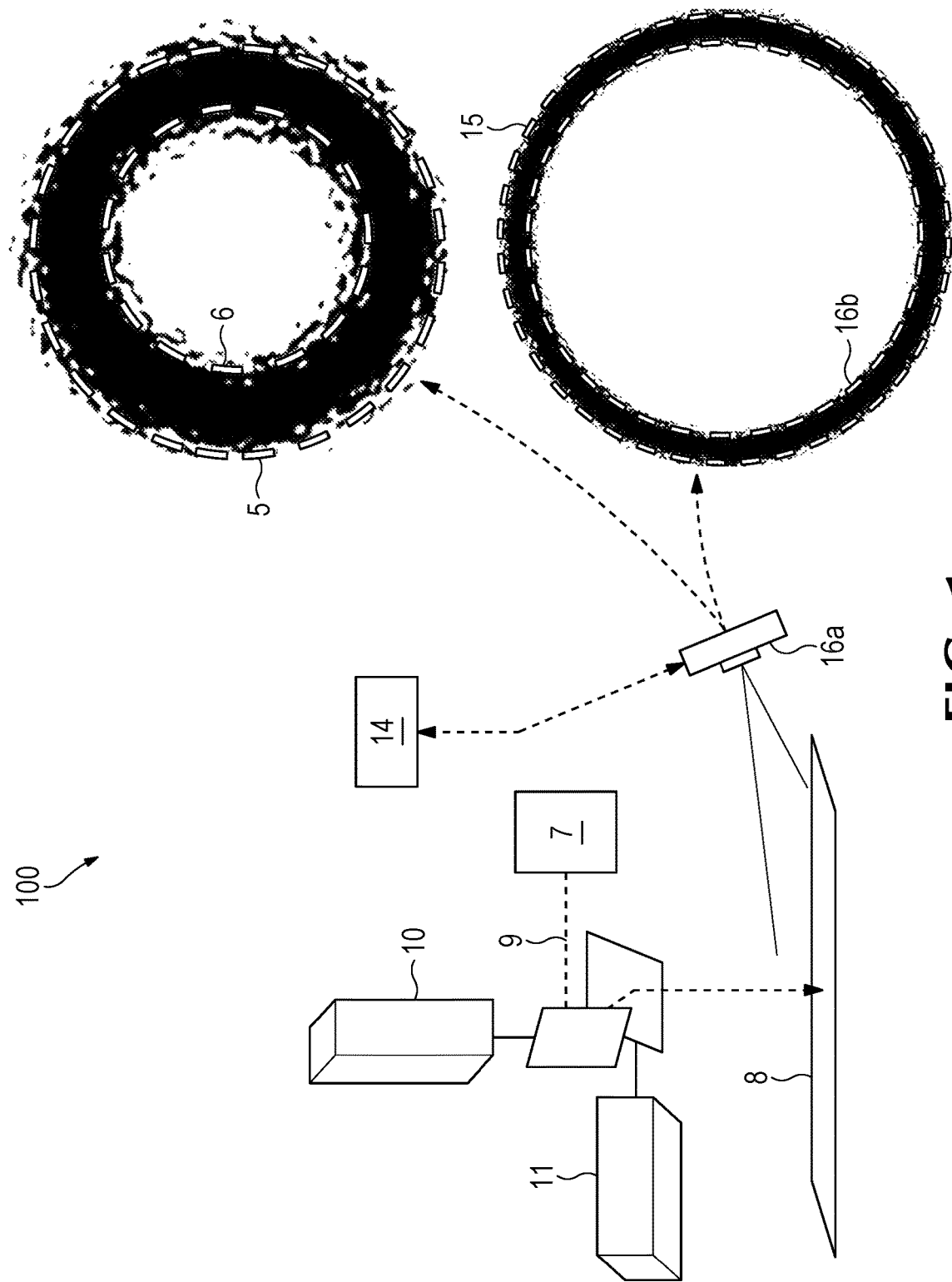
FIG. 1 illustrates a system for calibration validation of a galvanometric scanning system (GSS) for laser marking, according to some embodiments.

Some embodiments may include a method of generating assessment data in a system including a galvanometric scanning system (GSS) having a laser device to generate a laser beam and an X-Y scan head module to position the laser beam on a work piece. The method may include selecting a dimension based on a desired accuracy for validation (and/or a characteristic of an imaging system in embodiments that utilize an imaging system). The method may include commanding the GSS to draw a mark based on a polygon or ellipse of the selected dimension around a predetermined target point associated with the work piece to generate assessment data, and following operation of the GSS based on said commanding, validating a calibration of the GSS using the assessment data (or an image thereof in embodiments that utilize an imaging system). Other embodiments may be disclosed and/or claimed.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Some methods to validate a calibration of a marking system may include selecting a test point and commanding the laser to mark the selected test point. An optical coordinate measurement machine (CMM) may be used to attempt to discern whether the marked location corresponds to the test point, or not.

There are a number of challenges with discerning results following the marking, particularly in the case of laser markings. A laser-drawn line in a marking feature may have a thickness that is greater than the desired accuracy, which creates challenges in identifying the center of intersecting laser-drawn lines. If an imaging sytem is only to choose two lines and calculate their intersection, the cross pattern may have many combinations some of which may not reflect the actual center of the cross pattern.

Another challenge specific to laser markings is that laser-drawn line edges may be non-uniform and/or not be sharp under magnification of the marking feature. These characteristics may lead to ambiguity if the imaging system attempts to calculate a width of the laser drawn line (for calculating the center). One system-identified side of a laser-drawn line could be at a different distance from the actual center than another system-identified side of the laser-drawn line, due to non-uniformity in the local edge mark quality. In view of these and other reasons, some offsets may go undetected by some CMM-based calibration validation systems.

Some methods and/or systems described herein may command the marking device to draw a mark based on one or more polygons or one or more ellipses (e.g., fully draw the polygon or ellipse or partially draw the polygon or ellipse such as, in the case of a ellipse, by drawing an arc of the selected diameter/radius) at predetermined locations. An imaging system may be used to image the geometric features with sufficient magnification and fit a parametrically defined polygon or ellipse of a given dimension to the marked geometric feature image. Use of the geometric feature may be resistant to imaging system measurement errors.

One embodiment includes commanding the laser system to mark one or more geometric features centered on a test point. By "centered on" the test point, we mean around the test point—in our approach there is no attempt to mark the test point itself (in contrast to some other calibration validation approaches that attempt to mark the test point). To detect large calibration errors, small polygons or ellipse may be chosen, e.g., in the case of small geometrically perfect circles (one example of an ellipse), say, 1 mm in diameter, so that the features may be visible in an imaging system (e.g., an optical CMM) as the imaging system slews to each location in search of the feature. That is to say, in some embodiments, the dimension of the small geometric feature may be selected based on predefined characteristics of the imaging system, to optimize detection/location by the imaging system.

The laser marking may be just as thick as with intersecting lines, and as such may have an inside edge associated with an inner dimension (e.g., an inner diameter) and an outside edge associated with an outer dimension (e.g., an outer diameter). However, the center of the geometric feature may be the same point regardless of whether the inside or outside dimension is used. Therefore, the imaging system may unambiguously identify the center of a geometric feature independently of line thickness, line edge uniformity, ill-defined edges, or the like.

In addition to drawing the small dimension geometric feature, the method may include commanding the marking system to draw a large geometric feature. The large dimension may be selected to be as large as the field of the view of the imaging system allows to optimize movement by the mirrors. An attempt to draw the largest camera-detectable geometric feature may result in significantly exercising the X-Y scan head module (e.g., large mirror movements), which may expose small offset errors.

According to various embodiments, one or more commands for the one or more larger geometric features may be before or after a validation of no large errors using the small geometric feature. However, detection of the largest geometric feature by the imaging system may be performed after validating no large errors, in some embodiments. Given that the dimension of the largest geometric feature may be as large as possible based on the field of view of the imaging system, the presence of a large offset error may cause the largest geometric feature to be undetectable by the imaging system even at the lowest magnification possible for the imaging system. Therefore, in some embodiments if a large offset error is detected an attempt to detect any largest geometric feature may be skipped and a large offset error indicated. Of course, if a calibration is performed to attempt to correct a large offset error then a calibration validation process may be repeated with detection of both large and small offset errors.

Some embodiments described herein provide a robust and highly accurate acquisition of the position of a marked object regardless of the feature line width when measured with an imaging system. These embodiments may permit measurement accuracy many times the marked object's line thickness and may be insensitive to line thickness variability and/or other variabilities associated with individual marking systems.

FIG. 1 illustrates a system 100 for calibration validation of a galvanometric scanning system (GSS) for laser marking, according to some embodiments. The system 100 includes GSS having a laser device 7 to generate a laser beam 9, an X-Y scan module to move the laser beam 9 relative to a work piece 8. The X-Y scan module may include an X galvo motor 10 to drive rotation of a mirror and a Y galvo motor 11 to drive rotation of a mirror. The system may be a two or three axis GSS (in three-axis embodiments, the system 100 may include a dynamic focus module (not shown) to control a focus of the laser beam 9 along a Z direction of propagation).

In some camera-aided evaluation embodiments, the system 100 may also include an imaging system (e.g., an optical CMM) including a camera 15 to image the work piece 8 following marking the work piece 8 with the laser beam 9. In embodiments that include the imaging system, the imaging system may be a component of the GSS, e.g., an integrated CMM, to image the work piece 8 in place. In other embodiments, the camera 15 may be part of a separate imaging system and the work piece 8 may be carried to the imaging system to be imaged. The imaging system may have any desired characteristics, such as a field of view (e.g., a maximum field of view at a lowest magnification).

The system 100 may also include one or more computing devices 14 each including at least one processor configured to execute instructions stored in a memory. The computing device(s) 14 may be in communication with any component of the system 100 to perform any GSS calibration validation operations described herein. In embodiments including the imaging system, at least one of the computing devices may be a computing device of the imaging system, in communication with the camera 15 and including a processor programmed to perform any imaging system process described herein.

In a calibration validation of the GSS using the system 100, one or more dimensions may be selected based on a desired accuracy for validation. In the illustrated example where circular geometric feature(s) are to be drawn, the one or more dimensions may be diameter(s)/radius(es); however, this is not required. In some embodiments, non-circular geometric feature(s) such as rectangles, triangles, octagons, or other polygons, may be drawn, and in these cases the selected dimension(s) may be a characteristic dimension (e.g., length, chord length, or the like) associated with the non-circular geometric feature(s) to be drawn. Some examples of these other "non-circular" embodiments will be described later, with reference to FIGS. 6-8.

Referring again to FIG. 1, to check for large offsets (e.g., minimal accuracy validation), a small diameter may be selected. In embodiments utilizing the imaging system, the one or more diameters may also be selected based on a characteristic of the imaging system. For instance, the diameter may be selected to be smaller than the field of view of the imaging system to ensure detection of a small circular feature even in the case of a large offset. The diameter may be selected to optimize for fast and/or reliable detection based on any other characteristics of the imaging system, such as characteristics of predefined imaging system routine operations of the imaging system.

To check for small offsets (e.g., high accuracy validation), a larger diameter may be selected. In embodiments that include the imaging system, this diameter may correspond to maximum field of view of the imaging system at the lowest possible magnification of the imaging system. In some embodiments, it may be possible and practical to select additional diameters between the largest and smallest diameter. Any diameter described herein may be selected by a person based on desired accuracy for validation (and/or using available information about the imaging system and then input into computing device(s) 14 or selected by the computing device(s) 14 based on predefined information about the imaging system in camera-aided embodiments).

One or more commands may be input to control the GSS (e.g., using the computing device(s) 14) to draw marking(s) based on one or more ellipses (or a marking based on one or more polygons in other embodiments) on the work piece 8 based on the selected diameter(s). In one example, an ellipse (or arc thereof) may be drawn for each selected diameter before any imaging. In other examples, ellipse(s) or arc(s) may be drawn for only some of the selected diameters (e.g., a smallest selected diameter) to check for large offset errors beforedrawing the other ellipses or arcs.

In embodiments that include the imaging system, the imaging system may be operated to image the work piece 8 to generate electronic assessment data following a marking. A high magnification image of a small diameter ellipse of electronic assessment data is shown. The imaging system may recognize a circular feature in the image, and attempt to place a parametric ellipse 5 on an inner perimeter and a parametric ellipse 6 on an outer perimeter of the circular feature. The imaging system may locate a center of the ellipse 5 and 6.

Due to the ill-defined edge at this magnification, a location to place the parametric ellipses 5 and 6 may be variable within a non-zero range. However, the identified center of the ellipses 5 and 6 will be the same regardless of where the ellipses 5 and 6 are placed in this non-zero range. This allows a value of a threshold used for validating the calibration to be significantly less than a value of a width of laser marks generated by the GSS, according to various embodiments.

An offset between the identified center and the commanded location may be determined. If this offset is greater than a threshold, the calibration of the GSS may be considered to not pass validation, and the process may end. If an attempt is made to recalibrate the GSS, another calibration validation may be attempted. The determination of the offset may be made with aid of the imaging system, in some examples, although this is not required.

On the other hand if the offset is less than the threshold, the imaging system may attempt to locate the larger diameter feature at a lower magnification setting. This may include the computing device(s) 14 providing more commands to the GSS and/or controlling more imaging by the imaging system, depending on preferences. A low magnification image of the largest diameter ellipse is shown. At this magnification, the edge may appear more defined, but in any case the inner and outer diameters 15 and 16 have a same center. An offset between the identified center and the commanded location may be determined. If this offset is greater than a threshold for high accuracy, the calibration of the GSS may be considered to not pass validation, and the process may end. On the other hand, if this offset is not greater than the threshold for high accuracy, validation of the calibration of the GSS may be indicated.

In some embodiments, assessment data generated by the system 100 may include markings on the work piece 8 itself. In these embodiments, a calibration validation of the GSS may be made by visual inspection of the work piece 8 by an operator. For instance, an operator may measure a difference between a center of a geometric feature appearing in the assessment data (e.g., markings on the work piece) and the target point. The operator may determine whether the difference is greater than a preset threshold—if there is no difference or the difference is minimal the operator may validate the calibration of the GSS. The validation may be recorded in a computer storage, such as a database, and/or recorded on some other medium (such as by initiating a label on the GSS, or some other means of recordation).

In any example described herein, the larger dimension polygon or ellipse may be drawn on the same work piece 8, or on a new work piece (not shown). The larger polygon or ellipse may be drawn during the same session that the smaller polygon or ellipse is drawn, or drawn in different sessions (say, following a determination of a calibration validation based on a large offset threshold using the same work piece 8 or a new work piece).

In any embodiment described herein, validating a calibration of the GSS may include measuring residual errors of a calibration of the GSS using the assessment data. The difference between the center of the geometric feature and the target point may correlate with an amount of the residual error (hence identifying the difference between the center and the target point may include obtaining a measurement of the residual error of the calibration of the GSS). This measurement may be checked against a reference (such as a threshold, or some other reference), and the calibration of the GSS may be validated based on a result thereof.

Figure 2:
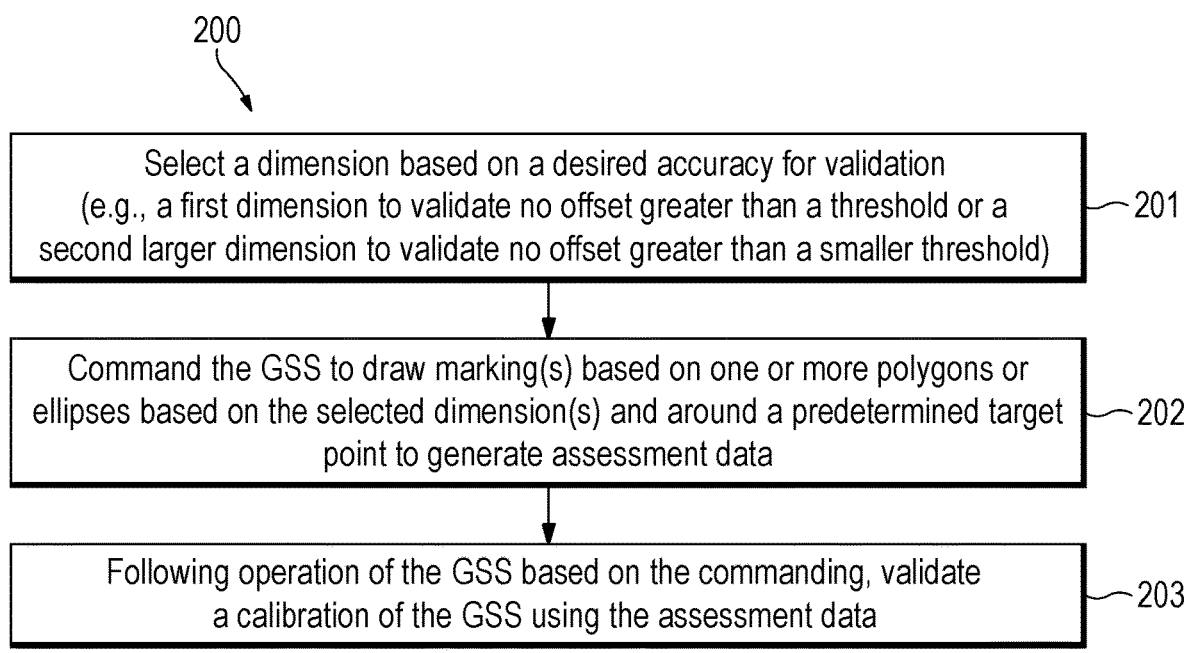
FIG. 2 illustrates a process of generating assessment data on the work piece or by imaging the work piece, and validating a calibration of the GSS using the assessment data, according to some embodiments.

FIG. 2 illustrates a process 200 of generating assessment data on the work piece 8 or by imaging the work piece 8, and validating a calibration of the GSS using the assessment data, according to some embodiments. In block 201, a dimension may be selected based on a desired accuracy for validation. If validation for small offset errors is desired, a large dimension may be chosen. On the other hand, if validation for large offset errors is desired, a small dimension may be chosen. More than one dimension may be chosen depending on calibration validation preferences.

In block 202, the GSS may be commanded to draw a marking based on one or more polygons or ellipses based on the selected dimension(s) and around a predetermined target point to generate assessment data. The assessment data may include markings on the work piece 8 following the operation of the GSS.

In block 203, following operation of the GSS, a validation of the calibration of the GSS may be made using the assessment data. For instance, an operator may measure an offset from a center of a pattern on the work piece 8 and the predetermined target point, and validate the calibration of the GSS if the measurement is not greater than a predefined threshold.

Figure 3:
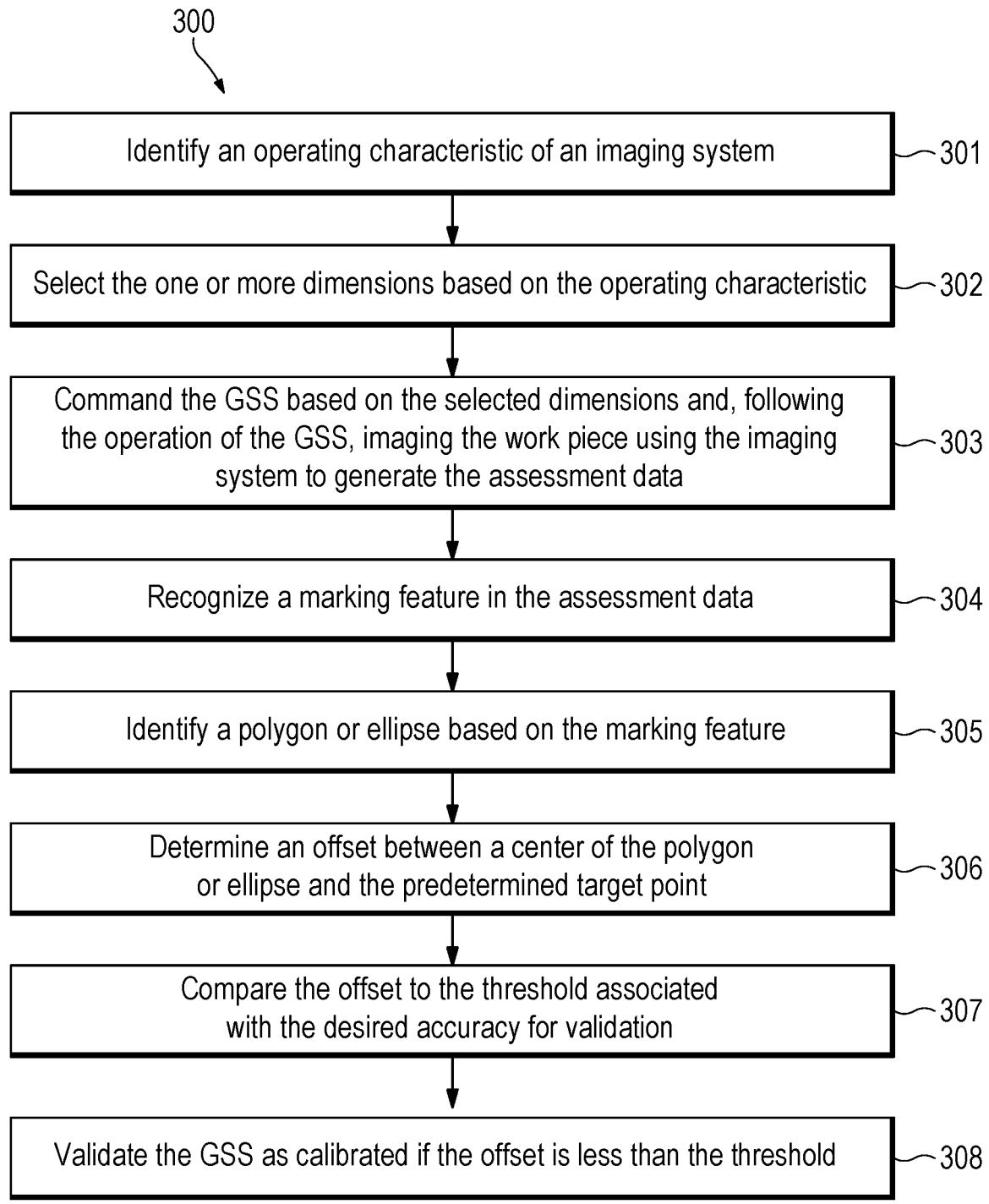
FIG. 3 illustrates a process of camera-aided generation of assessment data and evaluation thereof, according to some embodiments.

FIG. 3 illustrates a process 300 of camera-aided generation of assessment data and evaluation thereof, according to some embodiments. In block 301, an operating characteristic of an imaging system (e.g., the camera 15 and at least one of the computing devices 14 of FIG. 1) may be identified (e.g., a field of view, magnification information, or the like, or combinations thereof). In block 302, one or more dimensions may be selected based on (e.g., based at least in part on) the operating characteristic. Of course the one or more dimensions may be selected based on other factors as well, such as the desired accuracy for validation (FIG. 2, block 201). In block 303, the GSS is commanded based on the selected dimensions and the resulting work piece may be imaged using the imaging system to generate the assessment data.

In block 304, the imaging system may recognize a marking feature in the assessment data. In block 305, the imaging system may identify a polygon or ellipse based on the marking feature, e.g., by fitting a parametrically defined polygon or ellipse to the recognized marking feature.

In block 306, the imaging system may determine an offset between a center of the polygon or ellipse and the predetermined target point. In block 307, the imaging system may compare the offset to a threshold associated with the desired accuracy for validation. In block 308, the imaging system may validate the GSS as calibrated if the offset is less than the threshold.

In some embodiments the imaging system may be integrated into a scanner system (e.g., GSS described with reference to FIG. 1). In any embodiment herein, such as those in which the scanner system includes an integrated imaging system, any offset assessment may be done by operations performed by the imaging system alone or in combination with the scanner system. In one example, the scanner system may perform a hunting routine, where the scan head moves around to place the polygon's or ellipse's center in a fixed location in the field of view of the imaging system.

Figure 4:
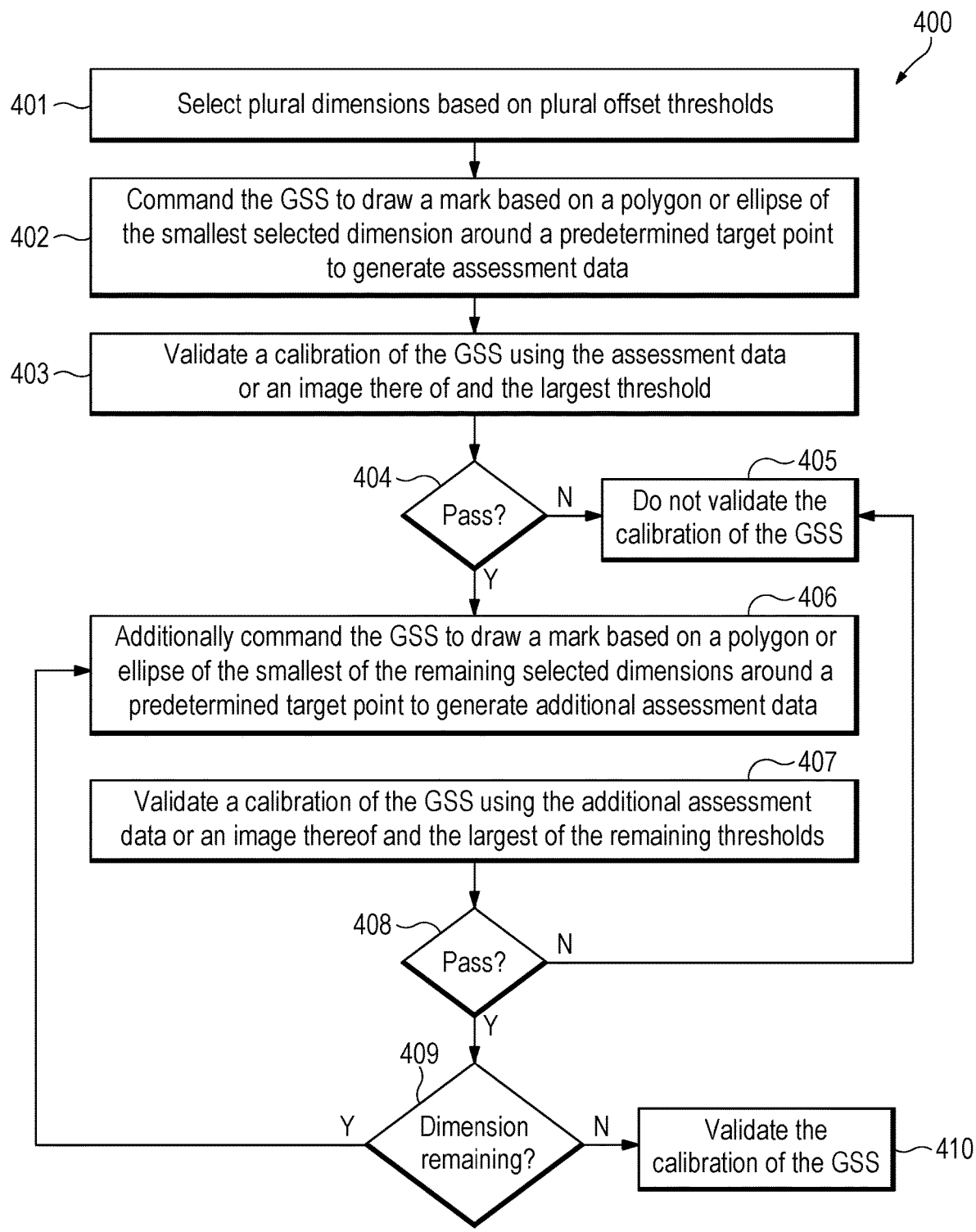
FIG. 4 illustrates a process of plural-stage calibration validation based on plural thresholds, according to some embodiments.

FIG. 4 illustrates a process 400 of plural-stage calibration validation based on plural thresholds, according to some embodiments. In block 401, plural dimensions may be selected based on plural offset thresholds. In embodiments that use the imaging system, one or more of the selected dimensions may also be selected based on a characteristic of the imaging system.

In block 402, the GSS may be commanded to draw a marking based on a polygon or ellipse of the smallest of the selected dimensions around a predetermined target point to generate assessment data. In block 403, a calibration of the GSS may be validated using the assessment data (e.g., the work piece) or an image thereof (in embodiments that use an imaging system) and the largest threshold. If an offset is greater than the largest threshold in diamond 404, then in block 405 the GSS is not validated as calibrated.

If the offset is not greater than the largest threshold in diamond 404, then in block 406 the GSS may be additionally commanded to draw a marking based on a polygon or ellipse of the smallest remaining dimension of the selected dimensions around a predetermined target point to generated additional assessment data. In block 407, a calibration of the GSS may be validated using the additional assessment data (or a an image thereof) and the largest of the remaining thresholds. If an offset is greater than the current threshold in diamond 408, then in block 405 the GSS is not validated as calibrated.

If the offset is not greater than the current threshold in diamond 408, then in diamond 409 if there is a dimension remaining the process 400 returns to block 406. If there are no dimensions remaining in diamond 409, then in block 410 the calibration of the GSS is validated.

Figure 5:
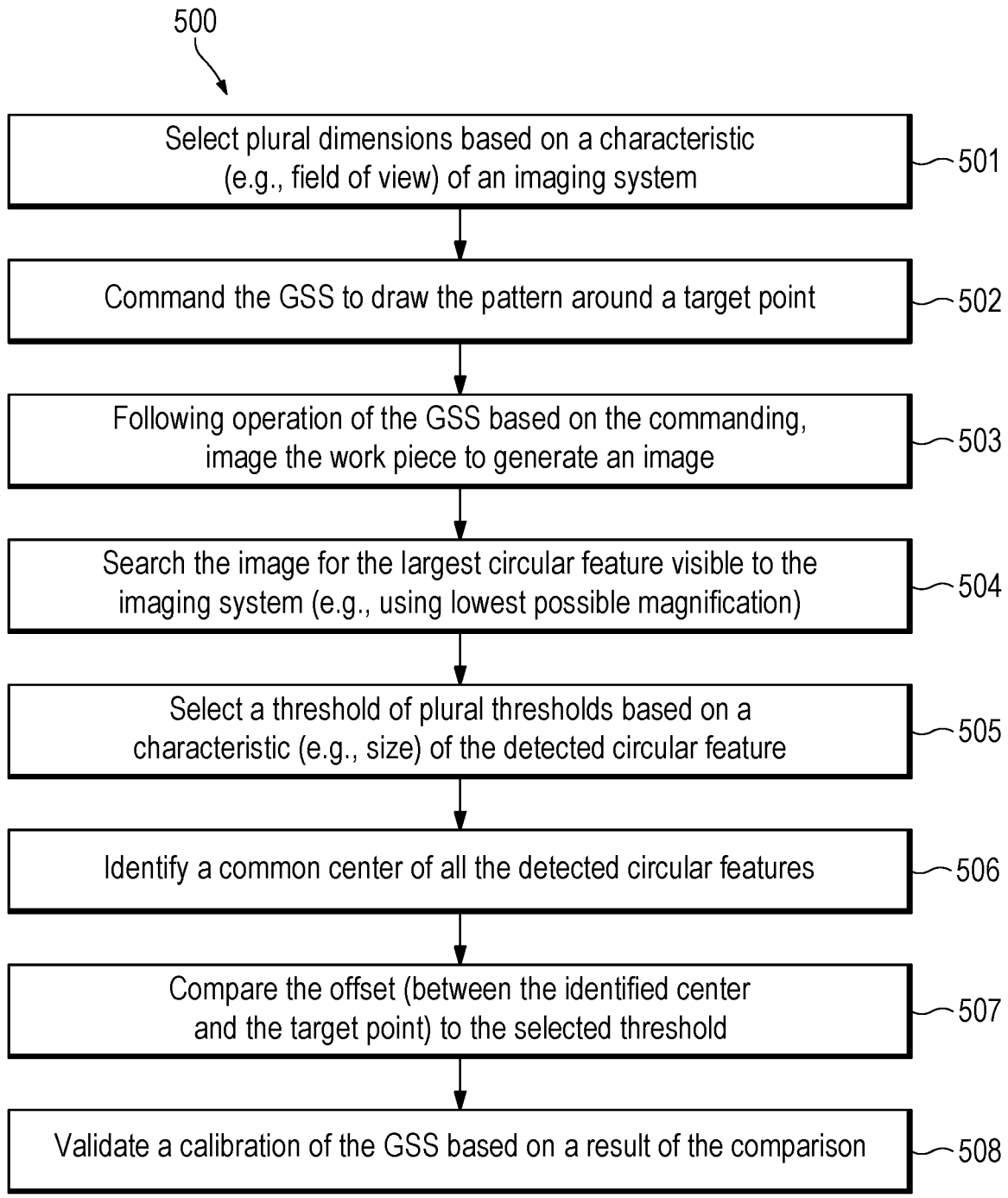
FIG. 5 illustrates a process of calibration validation using plural geometry pattern, according to some embodiments.

FIG. 5 illustrates a process 500 of calibration validation using a plural polygon or ellipse pattern and an imaging system, according to some embodiments. In block 501, the imaging system may select plural dimensions based on a characteristic (e.g., field of view) of the imaging system. In block 502, the GSS may be commanded to draw the pattern around a target.

Following the operation of the GSS based on the commanding, in block 503 the imaging system may image the work piece to generate an image. In block 504 the imaging system may search the image for the largest geometric feature visible to the imaging system (e.g., using the lowest possible magnification).

In block 505, the imaging system may select a threshold of plural thresholds based on a characteristic (e.g., size) of the detected geometric feature. For instance, the imaging system may discover that the largest visible feature correlates to the next largest dimension of the plural dimensions, which indicates that the largest feature was not visible to the imaging system. In this case, the imaging system may select the corresponding threshold (e.g., the next smallest threshold). In contrast, if the largest visible feature does correspond to the largest dimension, then the imaging system may select the smallest threshold.

In block 506, the imaging system may identify a common center of all the detected geometric features. In block 507, the imaging system may compare the offset (between the identified center and the target point) to the selected threshold. In block 508, the imaging system may validate a calibration for the GSS based on a result of the comparison. The imaging system may indicate a degree of accuracy of the calibration, based on which threshold was used (e.g., if the smallest threshold was used, the calibration may be validated based on the greatest accuracy).

One advantage of having a pattern with more than one polygon or ellipse on the workpiece is that a single magnification imaging system may be used. In such a case, the imaging system may measure the largest polygon or ellipse visible to the single magnification imaging system.

In one example, a pattern including more than one polygon or ellipse of different size is drawn around an analysis point. An imaging system (such as a remote CMM) may slew with high accuracy to each predetermined assessment point on the pattern. The largest polygon or ellipse may completely fill the field of view (and thus be visible wholly to the CMM) only if residential calibration errors are low (small threshold errors). So in the case of errors greater than this small threshold, the largest wholly visible polygon or ellipse may not be the largest polygon or ellipse of the pattern. For a very large error (large threshold errors), it may be possible for only the smallest polygon or ellipse to be visible. Therefore, an assessment of which polygon or ellipse is visible may indicate whether the laser marking system has a calibration less than the small threshold (largest polygon or ellipse visible), greater than the large threshold (only smallest polygon or ellipse visible), or between the thresholds (the smallest polygon or ellipse and an additional polygon or ellipse are visible).

As mentioned earlier, in any example described herein a polygon may be used. In these examples, an inner boundary and an outer boundary of the laser mark may have the same geometric center. The laser mark may have n-order rotational symmetry in which n is greater than one. The geometry of such a laser mark may identically repeat its shape when rotated by 1/nth of 360 degrees. The geometric center of the laser mark may be unchanged with the scale of the polygon.

Figure 6:
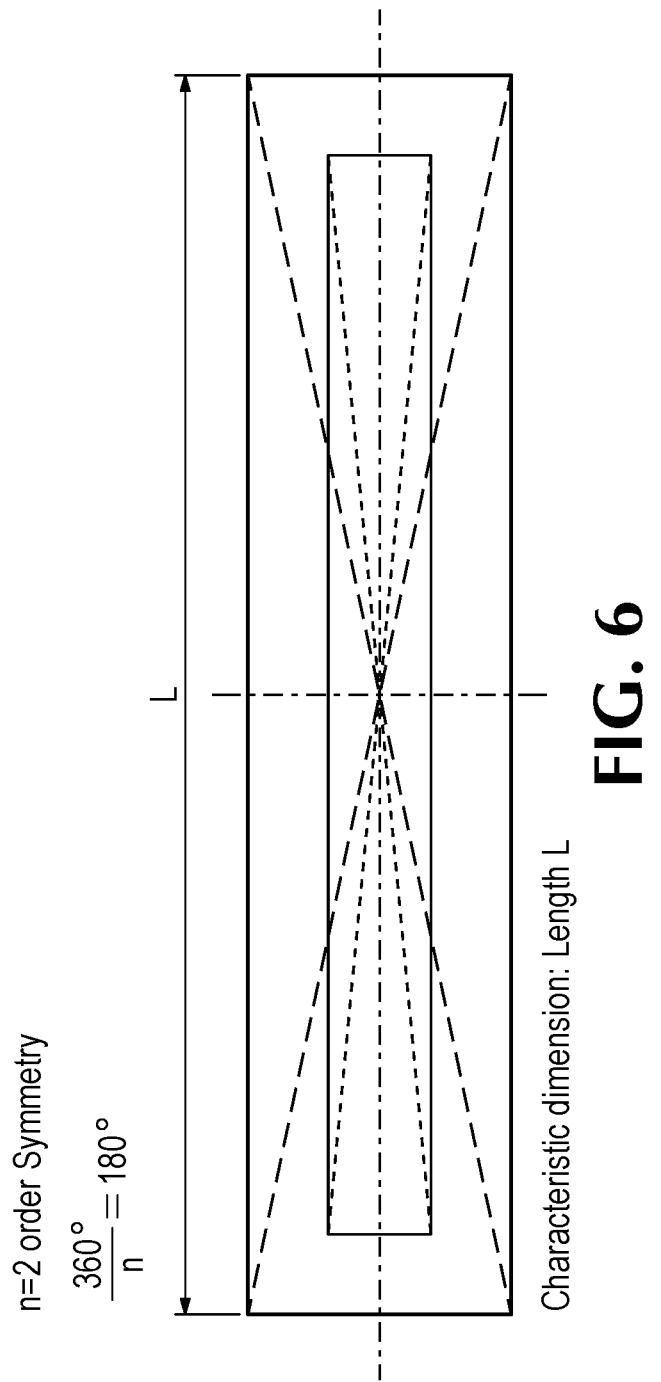
FIG. 6 illustrates another example of a laser mark that may be drawn around a test point for calibration validation of the GSS of FIG. 1, according to some embodiments.
Figure 7:
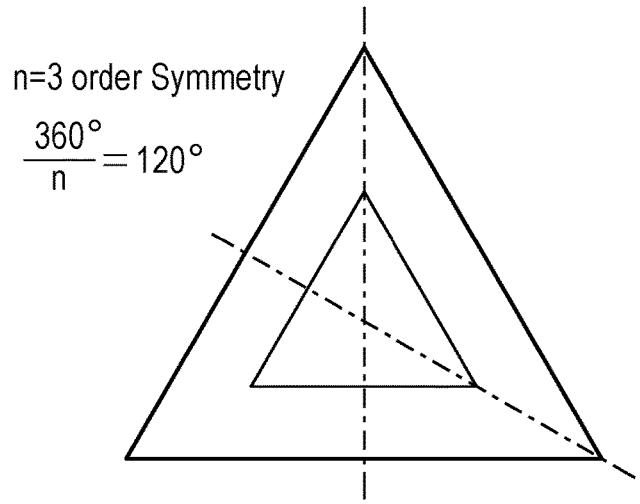
FIG. 7 illustrates another example of a laser mark that may be drawn around a test point for calibration validation of the GSS of FIG. 1, according to some embodiments.
Figure 8:
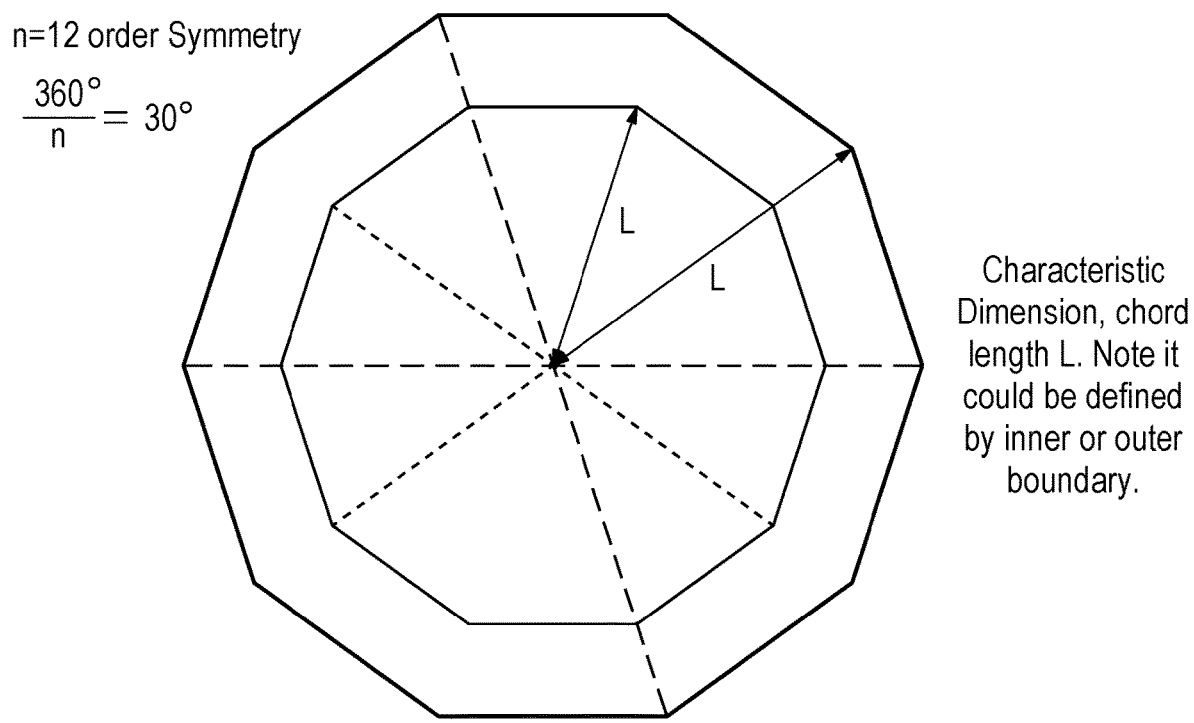
FIG. 8 illustrates another example of a laser mark that may be drawn around a test point for calibration validation of the GSS of FIG. 1, according to some embodiments.

FIGS. 6-8 illustrate other examples of laser marks that may be drawn around a test point for calibration validation of the GSS of FIG. 1. The center of each of these laser marks may be derived with any imaging system described herein using a characteristic dimension correspond to its shape.

For the rectangular laser mark illustrated in FIG. 6, the characteristic dimension is length L. The dashed lines in FIG. 6 illustrate that the center of the inner boundary of the laser mark is the same as the center of the outer boundary of the laser mark.

For the triangular laser mark illustrated in FIG. 7, the shape is an equilateral triangle and the characteristic dimension is a length of one of the sides of the equilateral triangle. A center of the inner boundary of the laser mark is a same as the center of the outer boundary of the laser mark with the equilateral triangle shape.

For the hexagonal laser mark illustrated in FIG. 8, the shape is a hexagon and the characteristic dimension may be a chord length associated with the inner boundary or a chord length associated with the outer boundary. A center of the inner boundary of the laser mark is a same as the center of the outer boundary of the laser mark with the pentagon shape. Hexagonal, octagonal, isogonal, etc., shaped laser marks may be used in other examples and the characteristic dimension may be a chord length associated with the inner boundary or a chord length associated with the outer boundary.

Most of the equipment discussed above comprises hardware and associated software. For example, the typical imaging system and/or galvanometric system is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. An imaging system for use with a galvanometric scanning system (GSS) having a laser device to generate a laser beam and an X-Y scan head to position the laser beam on a workpiece, the imaging system comprising:
one or more processors configured to:
recognize a geometric marking feature in an image of the workpiece, wherein the geometric marking feature is centered on a point;
generate a geometric feature having a center, wherein the geometric feature is based on a logical polygon or ellipse;
locate the point by comparing the recognized geometric marking feature to the generated geometric feature, wherein the point is located without distinguishing a line intersection in the image of the workpiece; and
determine an offset between the located point and a predetermined target point, wherein the offset is indicative of an accuracy of a calibration of the GSS.

2. The imaging system of claim 1, wherein the geometric marking feature comprises a pattern including plural polygon portions or plural ellipse portions centered on the point, and wherein recognize a geometric marking feature in an image of the workpiece further comprises search the image for the largest one of the plural polygon portions or plural ellipse portions visible to the imaging system at a lowest magnification setting.

3. The imaging system of claim 1, wherein the offset comprises a first offset and in a case that the first offset is not greater than the threshold, the first offset is indicative of the accuracy of the calibration of the GSS, and wherein the one or more processors are further configured to:
recognize an additional geometric marking feature in an image of the workpiece or another workpiece, wherein the additional geometric marking feature is centered on a point;
generate an additional geometric feature having a center, in a case that the first offset is greater than the threshold, wherein the generated additional geometric feature is based on a larger logical polygon or ellipse;
locate the point associated with the recognized additional geometric feature by comparing the recognized additional geometric marking feature to the generated additional geometric feature;
determine a second offset between the point associated with the recognized additional geometric feature and the predetermined target point, wherein the second offset is indicative of the accuracy of the calibration of the GSS.

4. A system, comprising:
a galvanometric scanning system (GSS) having a laser device to generate a laser beam and an X-Y scan head to position the laser beam on a workpiece; and
an imaging system including one or more processors configured to:
recognize a geometric marking feature in an image of the workpiece, wherein the geometric marking feature is centered on a point;
generate a geometric feature having a center, wherein the geometric feature is based on a logical polygon or ellipse;
locate the point by comparing the recognized geometric marking feature to the generated geometric feature, wherein the point is located without distinguishing a line intersection in the image of the workpiece; and
determine an offset between the located point and a predetermined target point, wherein the offset is indicative of an accuracy of a calibration of the GSS.

5. The system of claim 4, wherein the geometric marking feature comprises a pattern including plural polygon portions or plural ellipse portions, and wherein recognize a geometric marking feature in an image of the workpiece further comprises search the image for the largest one of the plural polygon portions or plural ellipse portions visible to the imaging system at a lowest magnification setting.

6. The system of claim 4, wherein the offset comprises a first offset and in a case that the first offset is not greater than the threshold, the first offset is indicative of the accuracy of the calibration of the GSS, and wherein the one or more processors are further configured to:
recognize an additional geometric marking feature in an image of the workpiece or another workpiece, in a case that the first offset is greater than the threshold, wherein the additional geometric marking feature is centered on a point;
generate an additional geometric feature having a center, wherein the generated additional geometric feature is based on a larger logical polygon or ellipse;
locate the point associated with the recognized additional geometric marking feature by comparing the recognized additional geometric marking feature to the generated additional geometric feature;
determine a second offset between the point associated with the recognized additional geometric marking feature and the predetermined target point, wherein the second offset is indicative of the accuracy of the calibration of the GSS.

7. The system of claim 4, wherein the imaging system comprises an integrated optical coordinate measurement machine (CMM), wherein the integrated optical CMM comprises a component of the GSS.

8. A method of validation of a calibration of a galvanometric scanning system (GSS) having a laser device to generate a laser beam and an X-Y scan head to position the laser beam on a workpiece, the method comprising:
selecting a dimension based on a desired accuracy for validation and one or more characteristics of an imaging system to image the workpiece;
commanding the GSS to draw a mark based on a polygon or ellipse of the selected dimension around a predetermined target point associated with the workpiece to generate assessment data; and
following operation of the GSS based on said commanding:
imaging the workpiece using the imaging system to generate an image;
recognizing a geometric marking feature in the image, wherein the geometric marking feature is centered on a point;
generating a geometric feature having a center, wherein the geometric feature is based on a logical polygon or ellipse;
locating the point by comparing the recognized geometric marking feature to the generated geometric feature, wherein the point is located without distinguishing a line intersection in the image of the workpiece; and
determining an offset between the located point and the predetermined target point, wherein the offset is indicative of an accuracy of the calibration of the GSS.

9. The method of claim 8, wherein a characteristic of the one or more characteristics comprises a field of view of the imaging system at a lowest magnification.

10. The method of claim 8, wherein commanding the GSS to draw a mark based on a polygon or ellipse of the selected dimension around a predetermined target point associated with the workpiece comprises remotely commanding the GSS based on one or more communications transmitted over a network.

11. The method of claim 8, wherein the imaging system comprises an integrated optical coordinate measurement machine (CMM), wherein the integrated optical CMM comprises a component of the GSS.

12. The method of claim 8, wherein the polygon has n-order symmetry in which n is greater than one.

13. The method of claim 12, wherein the polygon comprises a rectangle, an equilateral triangle, a hexagon, an octagon, or an icosagon.

\* \* \* \* \*